United States Patent [19]

Nishikawa et al.

[11] 4,183,509

[45] Jan. 15, 1980

[54] SHOCK ABSORBER FOR VEHICLE USE

[75] Inventors: Masao Nishikawa, Tokyo; Hitoshi Yamamoto, Asaka, both of Japan

[73] Assignee: Honda Giken Kogyo Kabushiki Kaisha, Tokyo, Japan

[21] Appl. No.: 878,222

[22] Filed: Feb. 14, 1978

[30] Foreign Application Priority Data

Mar. 22, 1977 [JP] Japan ................................ 52-31334

[51] Int. Cl.² ............................................. F16F 9/44
[52] U.S. Cl. .................................... 267/8 R; 188/319
[58] Field of Search .............. 188/285, 287, 299, 319; 267/8 R, 34, 170; 16/52, DIG. 39; 280/710

[56] References Cited

U.S. PATENT DOCUMENTS

| 3,161,908 | 12/1964 | Walach | 16/52 |
| 3,263,983 | 8/1966 | Bliven | 267/8 R |
| 3,827,538 | 8/1974 | Morgan | 188/319 |
| 4,036,335 | 7/1977 | Thomspon et al. | 267/34 X |
| 4,076,225 | 2/1978 | Houghton | 188/287 X |

FOREIGN PATENT DOCUMENTS

| 25918 | of 1910 | United Kingdom | 188/319 |
| 326316 | 3/1930 | United Kingdom | 188/319 |

*Primary Examiner*—George E. A. Halvosa
*Attorney, Agent, or Firm*—Haseltine, Lake & Waters

[57] ABSTRACT

In a shock absorber of the type including a piston-cylinder assembly, a coiled suspension spring and a damping-force control mechanism arranged on the piston, the upper spring seat member is rotatably mounted on the top end of the piston rod and operatively connected with the control mechanism through a sleeve rotatably fitted over the piston rod to serve also as an adjusting dial. The control mechanism includes, among others, an orifice disc formed therein with circumferentially spaced orifices of different diameters and arranged on top of the piston. The orifice disc is rotatable with the sleeve selectively to place the orifices in fluid communication with a fluid passage formed through the piston. The damping characteristic of the shock absorber can be readily adjusted from outside whenever desired by manual operation of the adjusting dial or upper spring seat without the need for dismounting the absorber unit from the vehicle.

2 Claims, 7 Drawing Figures

SHOCK ABSORBER FOR VEHICLE USE

BACKGROUND AND SUMMARY OF THE INVENTION

This invention relates generally to shock absorbers usable in the suspension system of automotive vehicles and more particularly to those of the type including a piston-cylinder assembly and a damping-force control mechanism incorporated therein for controlling the damping effect upon the extending and contracting movement of the piston-cylinder assembly.

The present invention has for its primary object the provision of a novel shock absorber of the type described which is so designed that the damping-force control mechanism is readily adjustable from outside without the need of dismounting the shock absorber from the vehicle body.

The above and other objects and advantages of the present invention will become apparent from the following description when taken in conjunction with the accompanying drawings, which illustrate a few preferred embodiments of the present invention.

DESCRIPTION OF THE PREFERRED EMBODIMENTS

Description will first be made of the first preferred embodiment of the present invention shown in FIGS. 1 to 4.

Figure 1:
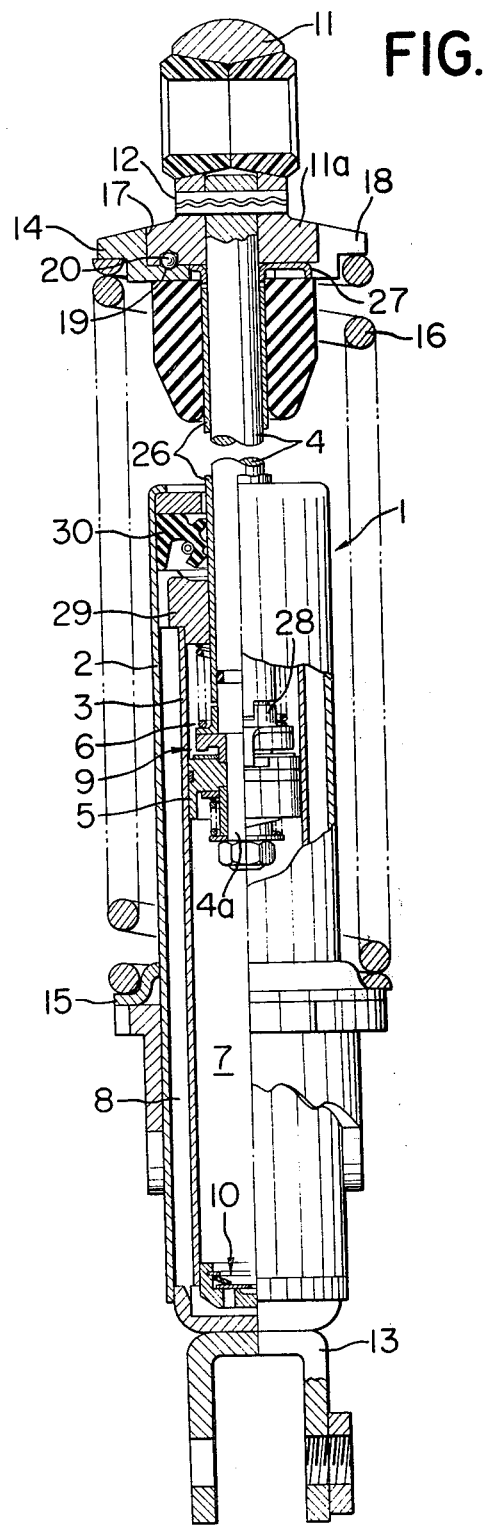
FIG. 1 is a side elevational view, partly in cross section, of a first preferred embodiment of the present invention.

Referring first to FIG. 1, the shock absorber illustrated therein and generally indicated by the reference numeral 1 is comprised of a piston-cylinder assembly, including a tubular casing 2, a hydraulic cylinder 3 fixedly secured in the tubular casing 2 coaxially therewith and filled with hydraulic oil, and a piston 5 slidably fitted in the cylinder 3 and integrally connected with a piston rod 4, which extends upwardly beyond the tubular casing 2. The space in the cylinder 3 is divided into two, upper and lower, fluid chambers 6 and 7 by the piston 5. The annular space 8 between the cylinder 3 and tubular casing 2 serves as an oil reservoir which is in communication with the lower fluid chamber 7. Provided on the piston 5 is a cushion valve mechanism 9 which, during extension of the shock absorber 1, controls the flow of oil from the upper fluid chamber 6 to the lower fluid chamber 7, thus developing a damping effect upon the extending motion of the shock absorber and which has a variable damping characteristic, as will be described later in detail. Another cushion valve mechanism 10 is provided at the bottom of the cylinder 3 for controlled fluid communication between the lower fluid chamber 7 and oil reservoir 8. This cushion valve mechanism 10 serves to control the flow of oil from the lower fluid chamber 7 to the oil reservoir 8 when the shock absorber 1 is contracted, thus developing a damping effect upon the contracting motion of the shock absorber.

An upper mounting member or holed housing member 11 is firmly secured to the top end of piston rod 4 by spring pin means 12 for connection with the body frame of the vehicle. Secured to the bottom end of the tubular casing 2 by welding is a U-shaped, lower mounting member 13 which is to be connected to a wheel-supporting member, for example, the swing rear fork of a motorcycle. A coiled suspension spring 16 is arranged between an annular upper spring seat 14, supported on the upper mounting member 11, and a lower spring seat 15, vertically adjustably mounted on the external periphery of the tubular casing 2 by appropriate well-known means.

Figure 2:
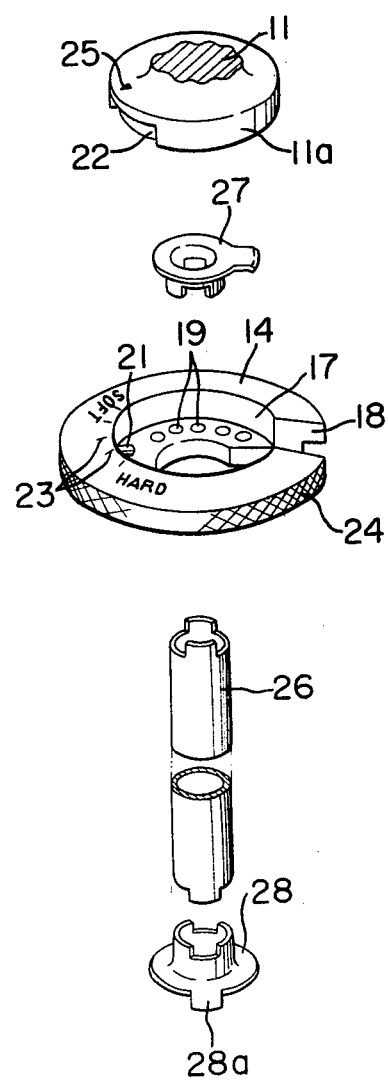
FIG. 2 is an exploded oblique view of the adjusting mechanism shown in FIG. 1.

The upper spring seat 14 is formed in its top with a circular recess or housing 17 which rotatably receives a flange portion 11a of upper mounting member 11 which is formed integral with the member 11 at its bottom. The upper spring seat 14 is also formed with a radially extending slot 18 and provided in the bottom of the housing 17 with two sets of circumferentially spaced notches 19 arranged symmetrically with respect to the line of diameter along which the slot 18 is formed, each set including five such notches, as shown in FIG. 2. A pair of positioning balls 20 are nested in the underside of the flange portion 11a of upper mounting member 11 for selective engagement with notches 19 in the respective sets. Only one of the two positioning balls 20 is shown in FIG. 1. Owing to the selective engagement of the balls 20 with the respective sets of notches 19, the upper spring seat 14 is rotatable relative to the upper mounting member 11 in five steps within a predetermined angular range. In this click stop mechanism, the interengaging state of the balls 20 and notches 19 is maintained under the bias of suspension spring 16 acting on the upper spring seat 14. In order to prevent any rotation of the upper spring seat 14 beyond the range including five angular positions, a stop pin 21 is secured thereto which projects radially into the housing 17 (see FIG. 2) and is received in an arcuate recess 22 formed in the flange portion 11a of upper mounting member 11 along the outer periphery thereof.

The upper spring seat 14 is provided on the top surface thereof with a scale 23 to indicate the intensity of the damping force arising in the cushion valve mechanism 9 and is knurled around the outer periphery thereof for providing a better grip, as indicated at 24 in FIG. 2. The upper spring seat 14 thus serves as a damping-force adjusting dial rotatable relative to the upper mounting member 11, which is provided on the top surface of its flange portion 11a with an index mark 25 so that the reading of scale 23 may be taken as desired.

The adjusting dial or upper spring seat 14 is connected through an upper claw-clutch member 27 with an adjusting sleeve member 26 for rotation therewith. The adjusting sleeve 26 is rotatably fitted over the piston rod 4 and is connected through a lower claw-clutch member 28 with the cushion valve mechanism 9, as will be described below in further detail, so that the cushion valve mechanism 9 can be controlled as desired by turning the adjusting dial or upper spring seat 14.

The adjusting sleeve 26 is slidably supported by a bearing member 29 which is firmly secured to the cylinder 3 as well as to the tubular casing 2 and an oil seal 30 is fitted in the tubular casing 2 as the top thereof to seal any oil possibly leaking through the slide bearing 29.

Description will next be made of the structure of the cushion valve mechanism 9 with reference to FIGS. 3 and 4.

Figure 3:
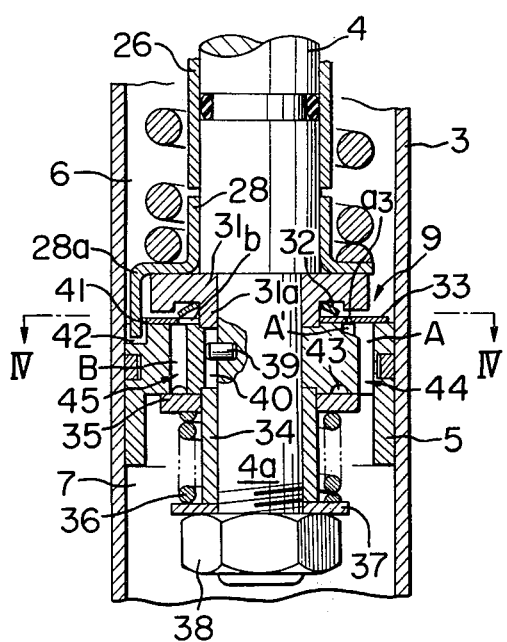
FIG. 3 is an enlarged fragmentary longitudinal cross section of the piston-cylinder assembly shown in FIG. 1, taken along the line III—III in FIG. 4.

The piston rod 4 has a reduced-diameter bottom end portion 4a on which are fittingly assembled a number of parts, including a rebound stop 31, a conical spring washer 32, an orifice disc 33, the piston 5, a spacer tube 34, a plate valve member 35, a coiled valve spring 36 and a spring seat 37, on the order illustrated in FIG. 3. Finally, a nut 38 is tightly fitted over the rod end portion 4a to hold these parts in place thereon and the rod end portion 4a is upset at its extreme end to prevent any loosening of the nut 38 and hence of the assembled parts. With this arrangement, the piston 5 and the rod end portion 4a are integrally joined together by means of a pin key 39 set on one side of the rod end portion 4a and a key groove 40 formed in the wall of the central bore of piston 5 for fitting engagement with the pin key 39. The orifice disc 33 is fitted over the boss portion 31a of rebound stop 31 for rotation and sliding movement relative thereto.

Figure 4:
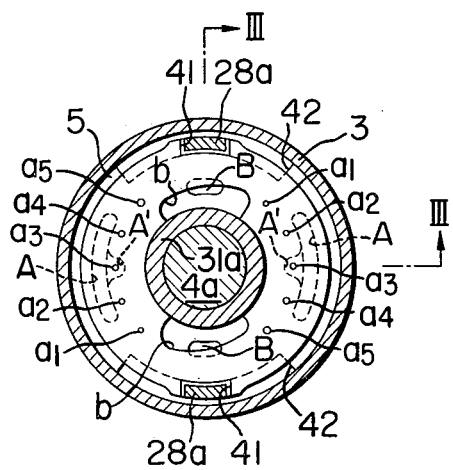
FIG. 4 is a transverse cross section of same taken along the line IV—IV in FIG. 3.

The orifice disc 33 is made of a thin steel sheet and formed with two sets of orifices a arranged symmetrically with respect to a disc diameter on a common circumferential line, each set including five such orifices $a_1, a_2, \ldots, a_5$, which are equally spaced from each other and have diameters increased successively in a clockwise direction in the order named, as shown in FIG. 4. Also, the orifice disc 33 is formed along the inner periphery thereof with a pair of window apertures b in positions diametrally opposite to each other. As shown, each of the window apertures b has its radially outside edge sloped radially outwardly in a clockwise direction. A pair of diametrally opposite arcuate notches 41 are also formed in the orifice disc 33 along the outer periphery thereof for engagement with respective claws or lugs 28a formed on the lower claw clutch member 28 so that the orifice disc 33 may be turned as desired through the intermediary of the clutch member 28. Reference numeral 42 indicates a pair of grooves formed in the piston 5 along the outer periphery thereof to clear the paths of clutch claws 28a.

The piston 5 is also formed therein with a pair of diametrally opposite arcuate slots A of a relatively large size and another pair of diametrally opposite arcuate slots B of a relatively small size. As shown in FIG. 3, these arcuate slots A and B extend axially through the piston and the larger slots A are in fluid communication with each other through an annular groove 43 formed in the underside of piston 5. The inner side wall of each of the arcuate slots A is recessed at its top, as indicated at A', and such recess A' is selectively placed in fluid communication with the orifices $a_1, a_2, \ldots, a_5$ in orifice disc 33 upon rotation thereof. The arcuate slots B are positioned in overlapping relation to the respective window apertures b, as shown in FIG. 4, and, in cooperation therewith, each form an orifice variable in cross section with rotation of the orifice disc 33.

The arcuate slots A with recesses A' together form a first fluid passage 44 for intercommunication of the upper and lower fluid chambers 6 and 7 in the cylinder 3 and the flow resistance of such fluid passage is determined by orifices $a_1, a_2, \ldots, $ or $a_5$ as placed in communication with the recesses A'. Also, the arcuate slots B and annular groove 45 together form a second fluid passage 45 which intercommunicates the upper and lower fluid chambers 6 and 7 and the flow resistance of such fluid passage is determined by the cross section of the variable orifices defined by the arcuate slots B and respective window apertures b associated therewith. It is to be noted, however, that the second fluid passage 45 is held closed by the valve member 35 under the bias of valve spring 36 unless the pressure in the upper fluid chamber 6 is increased to exceed a predetermined level.

Description will next be made of the operation of the first embodiment illustrated in FIGS. 1 to 4.

When an axial compressive load is applied to the shock absorber 1 in use, causing the piston 5 to descend within the cylinder 3, the pressure in the lower fluid chamber 7 is increased to cause the orifice disc 33 to rise apart from the top surface of piston 5 against the bias of the preloaded conical spring washer 32, thus allowing free passage of oil from the lower fluid chamber 7 to the upper one 6 through the arcuate slots A now opened. At the same time, there occurs a flow of oil from the lower fluid chamber 7 to the oil reservoir 8 through the cushion valve mechanism 10 as the fluid in the cylinder 3 is displaced by the descending piston rod 4, and a damping force is produced thereon in a conventional manner under the effect of flow constriction of the valve mechanism 10.

Subsequently, when the shock absorber 1 is restored or extended under the bias of the suspension spring 16, the orifice disc 33 is pressed against the top surface of the piston 5 under the pressure increased in the upper fluid chamber 6 and, restoring its adjusted preposition shown in FIG. 3, allows a flow of oil from the upper fluid chamber 6 to the lower fluid chamber 7 through the orifices $a_3$ and first fluid passage 44 as long as the rising speed of piston 5 remains relatively limited. Apparently, the flow of oil is restrained by the orifices $a_3$ and a predetermined damping force is obtained. In this stage, as the valve member 35 is still held closed, the damping characteristic of the cushion valve mechanism 9 follows a quadratic curve l shown in FIG. 5, which rises at a rate determined by the diameter of the orifices $a_3$.

Figure 5:
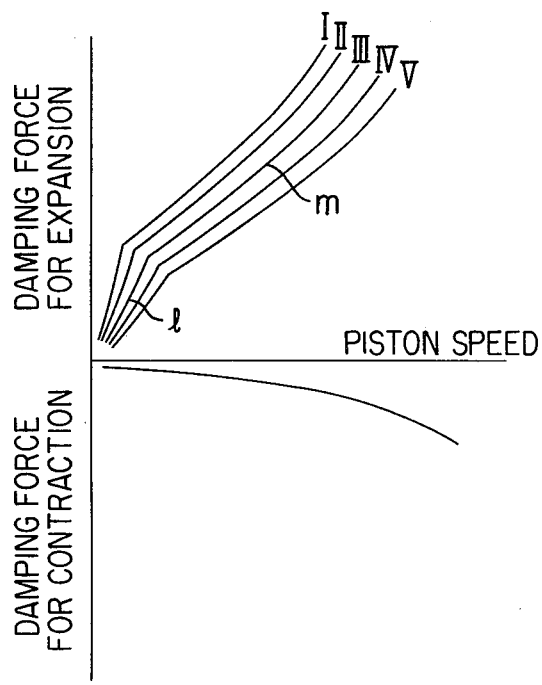
FIG. 5 is a diagram illustrating the damping characteristic curves of the shock absorber embodying the present invention.

Subsequently, when the rising speed of piston 5 has increased to such an extent that the differential pressure between the upper and lower fluid chambers 6 and 7 reaches a predetermined level, the valve member 35 is moved to open against the bias of the preloaded valve spring 36 so that a flow of oil is started also through the second fluid passage 45 to retard the rate of increase of the damping force of the cushion valve mechanism 9 and, accordingly, the damping characteristic curve is flexed to follow a line m in FIG. 5. It is to be noted that the point of flexion of the characteristic curve is determined by the load previously set on the valve spring 36.

Subsequently, when the rising speed of the piston 5 reaches a higher level, the oil flow through the second fluid passage 45 is restrained by the variable orifices defined by the arcuate slots B and cooperating window apertures b so that the characteristic curve m starts to again follow a quadratic curve, the slope of which is determined obviously by the cross-sectional area of the variable orifices.

In this connection, it is to be noted that, when the orifice disc 33 is rotated by means of the adjusting dial 14, not only the orifices $a_1, a_2, \ldots, a_5$ of different diameters in each set of orifices a formed in the orifice disc 33 are selectively placed in fluid communication with the adjacent one of arcuate slots A but also the variable orifices defined by the arcuate slots B and respective window apertures b are adjusted in cross-sectional area. In this manner, the flow resistances of the first and second fluid passages 44 and 45 are variable with rotation of the adjusting dial 14 to change the slope of quadratic curves l and m in the manner indicated in FIG. 5 at I, II, ..., V. Incidentally, if considered statically, the time at which the characteristic curve flexes between lines l and m should remain unchanged but actually it is slightly variable and the flex point is more or less shifted downward to the right as the characteristic curve is shifted in the order of I, II, ..., V, as shown in the diagram of FIG. 5, in which the abscissa represents the piston speed and the ordinate the damping force. Such tendency of the flex point to shift is apparently desirable from the standpoint of the cushioning performance of the shock absorber.

Figure 6:
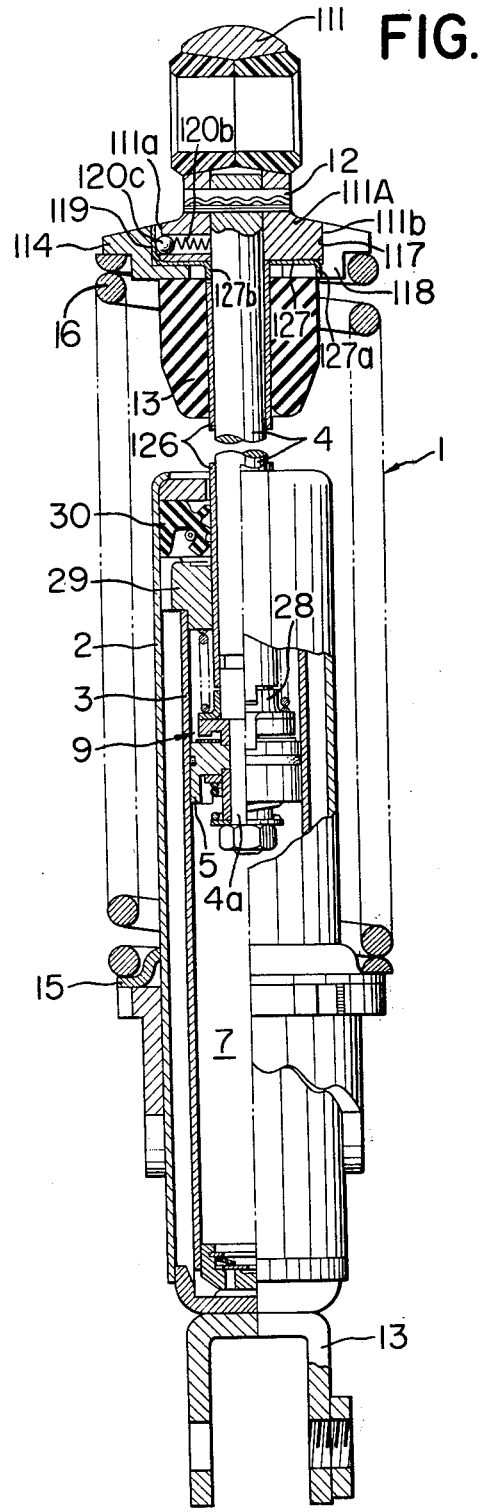
FIG. 6 is a side elevational view, partly in cross section, of another form of shock absorber embodying the present invention.
Figure 7:
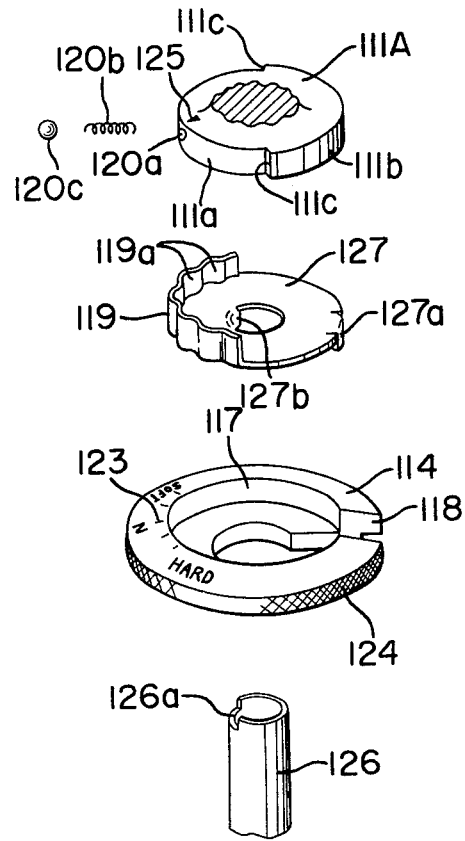
FIG. 7 is an exploded oblique view of the adjusting mechanism shown in FIG. 6.

FIGS. 6 and 7 illustrate another preferred embodiment of the present invention, which is substantially the same in structure as the previous embodiment except the upper spring seat and associated members, and, in these figures, the same references have been retained for similar parts which have the same functions.

As illustrated, this second embodiment includes an upper spring seat 114 which has formed therein a housing 117 and a radially extending slot 118 and receives in the housing 117 a bottom flange portion 111A of an upper mounting member 111 together with a connecting plate 127 which is press-formed and generally annular in shape. Formed integral with the connecting plate 127 are a connecting pawl or lug 127a which, extending from the outer periphery of the connecting plate 127, is bent down for engagement with the radial slot 118 in the upper spring seat 114 and another connecting pawl or lug 127b which, extending from the inner periphery of the connecting plate 127, is bent down for engagement with a notch 126a, which is formed in an adjusting sleeve 126 at the top thereof. In this manner, the connecting plate 127 serves to interconnect the upper spring seat 114 and adjusting sleeve 126 against relative rotation therebetween.

The connecting plate 127 is further formed with an arcuate notch plate 119 which extends upwardly from the outer periphery thereof and which is corrugated to define a multitude of circumferentially spaced notches 119a. The flange portion 111A of upper mounting member 111 is comprised of a smaller-diameter semi-circular segment 111a slidably held in contact with the notch plate 119 and a larger-diameter semi-circular segment 111b slidably held in engagement with the adjacent side wall of the housing 117, and is rotatable relative to the connecting plate 127 in an angular range limited by the opposite edges of notch plate 119, which lie each opposite to one of the radial shoulders 111c defined between the two semi-circular segments 111a and 111b for abutting engagement with such shoulders 111c. The smaller-diameter semi-circular segment 111a is formed with a bore 120a of limited diameter which extends radially therethrough and in which a positioning ball 120c is received for selective engagement with the notches 119a, formed in the notch plate 119, under the urge of a biasing spring 120b which is arranged in the bore 120a under compression between the ball 120c and the piston rod 4.

The flange portion 111A of upper mounting member 111 is provided on its top surface with an index mark 125 and, for cooperation therewith, a scale 125 is provided on the top surface of upper spring seat 114 to indicate the intensity of damping force as determined by the damping-force control mechanism 9. The upper spring seat 114 is knurled around the outer periphery thereof, as indicated at 124 in FIG. 7, for providing a better grip.

The knurled, upper spring seat 114 serves as an adjusting knob which is manually operable to rotate the adjusting sleeve 126 in either direction through the intermediary of connecting plate 127 thereby to adjust the damping-force control mechanism 9, as desired. In other words, again in this embodiment, the damping force obtainable with this shock absorber 1 can be adjusted conveniently by manual operation of the upper spring seat 114 and with the aid of the scale 123 and cooperating index mark 125. Once the upper spring seat 114 is properly set for the intensity of damping force desired, the positioning ball 120c is held in engagement with the selected one of notches 119a under the action of biasing spring 120b so that any inadvertent movement of the upper spring seat 114 and connecting plate 127 is effectively prevented.

Structural features and functional effects of this embodiment other than those described above are substantially the same as with the first embodiment previously described and any detailed description of them is believed to be unnecessary.

As described above, in the shock absorber of the present invention, the upper seat for the suspension spring is rotatably supported on the upper mounting member, secured to the top of the piston rod, and is operatively connected through the intermediary of a sleeve rotatably fitted over the piston rod with the damping-force control mechanism, arranged in the cylinder. With such arrangement, it will readily be noted that the damping-force control mechanism can be adjusted manually by turning the upper spring seat and that such manual adjusting operation can be performed with extreme ease without the need of dismounting the shock absorber from the vehicle body and without any hindrance from the suspension spring.

Moreover, the slope of the damping characteristic curve obtainable during extension of the shock absorber can be readily adjusted as desired owing to the extremely simple structure including an orifice disc rotatably mounted on top of the piston and operatively connected with the adjusting sleeve and hence with the upper spring seat, which serves as an adjusting dial. This means that the damping performance of the shock absorber can be adapted to the various operating conditions, including the driver's taste in ride and the amount of load on the vehicle, by simple manual operation of the adjusting dial. In addition, the damping force as determined by the orifices formed in the orifice disc is not influenced to any substantial extent by change in temperature of the hydraulic fluid because of the thin structure of the orifice disc and there is obtained at all times a stable damping performance. Also, such orifice disc is easy to fabricate and the shock absorber can also be employed satisfactorily on any different model of vehicle, even if a substantial change in magnitude of the damping force is needed, simply by replacing the orifice disc by one of a different orifice design modified to suit to the vehicle model. It will thus be appreciated that, according to the present invention, there is provided a shock absorber which is usable in a wide range of damping capacity and inexpensive to manufacture.

While only a few preferred embodiment of the invention has been shown and described, it will be understood to those skilled in the art that various changes and modifications may be made therein without departing from the scope of the invention as defined in the appended claims.

What is claimed is:

1. A shock absorber for vehicular use employing: a tubular casing provided at one end with a first mounting member for connection with a wheel-supporting member of a vehicle, a cylinder fixedly received in said casing, a piston slidably fitted in said cylinder to define a pair of first and second fluid chambers on the opposite sides thereof, a piston rod connected at one end with said piston and provided at the other end with a second mounting member for connection with a body portion of the vehicle, a damping-force control mechanism arranged in said cylinder for controlling the damping effect upon sliding movement of said piston relative to said cylinder, a first spring seat mounted on said piston rod for turning movement relative thereto, a second spring seat secured to said tubular casing, a suspension spring arranged between said first and second spring seats, a click stop mechanism provided between said first spring seat and said first mounting member for controlling the turning of said first spring seat relative to said piston rod in a stepwise manner, an adjusting sleeve fitted over said piston rod for rotation relative thereto, said adjusting sleeve being operatively connected at its opposite ends with said first spring seat and said damping-force control mechanism, said damping-force control mechanism comprising a first and a second fluid passageway formed in said piston for fluid communication between said first and second fluid chambers, an orifice disc connected to the adjusting sleeve on one side of said piston, for rotation relative to the latter and formed with a plurality of orifices of different diameters, said orifices being arranged so as to be selectively placed in fluid communication with said first fluid passageway upon rotation of said orifice disc relative to said piston, and a normally closed valve member arranged on the other side of said piston so as to open said second fluid passageway when the pressure in said first fluid chamber is increased to reach a predetermined level.

2. A shock absorber for vehicular use as set forth in claim 1, comprising a window aperture formed in said orifice disc so as to be cooperable with said second fluid passageway for defining a variable orifice which is varied in cross section with rotation of said orifice disc relative to said piston.

* * * * *